United States Patent
Mizukami et al.

(10) Patent No.: US 10,634,056 B2
(45) Date of Patent: Apr. 28, 2020

(54) COMBUSTOR AND GAS TURBINE

(71) Applicant: MITSUBISHI HITACHI POWER SYSTEMS, LTD., Kanagawa (JP)

(72) Inventors: Satoshi Mizukami, Tokyo (JP); Tetsu Konishi, Kanagawa (JP); Hiroyuki Yamazaki, Miyagi (JP); Tomoharu Fujita, Miyagi (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 286 days.

(21) Appl. No.: 15/519,668

(22) PCT Filed: Dec. 1, 2015

(86) PCT No.: PCT/JP2015/083824
§ 371 (c)(1),
(2) Date: Apr. 17, 2017

(87) PCT Pub. No.: WO2016/088783
PCT Pub. Date: Jun. 9, 2016

(65) Prior Publication Data
US 2017/0254267 A1    Sep. 7, 2017

(30) Foreign Application Priority Data

Dec. 2, 2014   (JP) .................. 2014-244314

(51) Int. Cl.
*F02C 7/18*   (2006.01)
*F02C 7/24*   (2006.01)
(Continued)

(52) U.S. Cl.
CPC ............... *F02C 7/18* (2013.01); *F01D 9/023* (2013.01); *F02C 3/04* (2013.01); *F02C 7/24* (2013.01);
(Continued)

(58) Field of Classification Search
CPC ............. F01D 9/023; F05D 2260/20; F05D 2260/201; F05D 2260/202; F05D 2240/35;
(Continued)

(56) References Cited

U.S. PATENT DOCUMENTS 8,590,314 B2 * 11/2013 McMahan ............... F23M 5/085
60/752
2010/0229563 A1    9/2010 Woolford et al.
(Continued)

FOREIGN PATENT DOCUMENTS

JP    2007-198384    8/2007
JP    2009-79483    4/2009
(Continued)

OTHER PUBLICATIONS

International Search Report dated Mar. 1, 2016 in International (PCT) Application No. PCT/JP2015/083824.
(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

A combustor including: a transition piece having a cylindrical shape and including an inlet of combustion gas at one end and an outlet of the combustion gas at the other end and configured to allow the combustion gas flowing from the inlet to flow out from the outlet so as to introduce the combustion gas into a turbine; a cooling medium introduction unit introduced with the cooling medium and provided on an outer periphery portion in an outlet side of the transition piece; a cooling medium inlet configured to introduce the cooling medium into the cooling medium introduction unit; and a cooling portion, connected to the cooling
(Continued)

medium introduction unit, provided on a portion from the outlet of the transition piece toward the inlet and configured to allow the cooling medium from the cooling medium introduction unit to pass through the outlet toward the inlet.

10 Claims, 8 Drawing Sheets

(51) Int. Cl.
    *F23R 3/46*     (2006.01)
    *F23R 3/00*     (2006.01)
    *F23R 3/42*     (2006.01)
    *F01D 9/02*     (2006.01)
    *F02C 3/04*     (2006.01)

(52) U.S. Cl.
    CPC ............... *F23R 3/002* (2013.01); *F23R 3/42* (2013.01); *F23R 3/46* (2013.01); *F05D 2220/32* (2013.01); *F05D 2240/35* (2013.01); *F23R 2900/03043* (2013.01); *F23R 2900/03044* (2013.01)

(58) Field of Classification Search
    CPC .... F23R 3/002; F23R 3/42; F23R 3/46; F23R 3/50; F23R 2900/03045; F23R 2900/03044; F02C 7/18

See application file for complete search history.

(56) References Cited

U.S. PATENT DOCUMENTS

| | | |
|---|---|---|
| 2010/0229564 A1 | 9/2010 | Chila |
| 2011/0252805 A1 | 10/2011 | Berry et al. |
| 2013/0036742 A1 | 2/2013 | Chila |
| 2015/0107262 A1* | 4/2015 | Maurer .................. F01D 9/023 60/785 |

FOREIGN PATENT DOCUMENTS

| | | |
|---|---|---|
| JP | 2010-209912 | 9/2010 |
| JP | 2011-226481 | 11/2011 |

OTHER PUBLICATIONS

Written Opinion dated Mar. 1, 2016 in International (PCT) Application No. PCT/JP2015/083824.

* cited by examiner

A-A

A-A

COMBUSTOR AND GAS TURBINE

FIELD

The present invention relates to a combustor used in a gas turbine and a gas turbine including the combustor.

BACKGROUND

A combustor of a gas turbine is subjected to high temperature when the gas turbine is running. Therefore, the combustor is cooled with air or gas such as steam used as a cooling medium. In such a gas turbine, there is known a gas turbine combustor configured to cool a combustion chamber of the combustor with the cooling medium (for example, Patent Literature 1).

CITATION LIST

Patent Literature

Patent Literature 1: JP 2009-079483 A

SUMMARY

Technical Problem

A combustor generally includes a transition piece for introducing combustion gas to a turbine. Since the transition piece is also subjected to high temperature, the transition piece is cooled by a cooling medium when a gas turbine is running. In a case of using air or gas such as steam as the cooling medium to cool the transition piece, it may be necessary to restrict a portion within a cooling portion of the transition piece where the cooling medium is introduced since other members in the gas turbine are also provided. In such a case, cooling performance of the cooling medium with respect to the transition piece may deteriorate.

An object of the present invention is to prevent deterioration of the cooling performance in a case of cooling the transition piece included in the combustor of the gas turbine with the cooling medium.

Solution to Problem

According to an aspect of the present invention, a combustor comprises: a transition piece having a cylindrical shape, and including an inlet of combustion gas at one end and an outlet of the combustion gas at another end, and configured to lead the combustion gas entering from the inlet to flow out from the outlet so as to introduce the combustion gas into a turbine; a cooling medium introduction unit provided at least on a portion of an outer periphery portion in a peripheral direction at an outlet side of the transition piece and in which a cooling medium is introduced; a cooling medium inlet provided on the cooling medium introduction unit and configured to introduce the cooling medium into the cooling medium introduction unit; a cooling portion provided on a portion ranging from the outlet of the transition piece to a predetermined position toward the inlet, connected to the cooling medium introduction unit so as to pass the cooling medium from the cooling medium introduction unit toward the inlet from the outlet; and a branching portion provided at least in a predetermined area in the peripheral direction of the transition piece including a portion farthest from the cooling medium inlet and configured to allow some of the cooling medium inside the cooling medium introduction unit to flow into the cooling portion at a portion closer to the inlet than the connecting portion where the cooling portion is connected to the cooling medium introduction unit.

This combustor allows a cooling medium of a cooling medium introduction unit to flow from branching portions to a midstream of a cooling portion. Accordingly, in regard to a portion, far from a cooling medium inlet, where a temperature of the cooling medium rises and cooling performance deteriorates, it is possible to allow the cooling medium having low temperature and high cooling performance to flow into such a portion. Therefore, it is possible to prevent deterioration of the cooling performance at the portion where the cooling performance has deteriorated. Thus, it is possible to prevent deterioration of the cooling performance in a case of cooling the transition piece included in the combustor of a gas turbine with the cooling medium.

Advantageously, in the combustor, the branching portion is provided at least at a central axis of rotation side of the turbine of the transition piece. The cooling medium inlet is mostly provided on an outside of the transition piece in a radial direction, that is, a portion separated from a central axis of rotation of a turbine. Therefore, a distance from the cooling medium inlet in a central axis of rotation side of the transition piece is large so that the cooling performance may deteriorate easily. By providing the branching portions in the central axis of rotation side of the transition piece, it is possible to prevent deterioration of the cooling performance in the central axis of rotation side of the transition piece.

Advantageously, in the combustor, the cooling portion separates the cooling medium flowing from the connecting portion and the cooling medium flowing from the branching portion and allows them to pass through the cooling portion. In such manners, it may be easy to control an amount of flow of the cooling medium flowing into the cooling portion through the branching portions and an amount of flow of the cooling medium flowing into the cooling portion through a connecting portion.

Advantageously, in the combustor, the cooling portion mixes the cooling medium flowing from the connecting portion and the cooling medium flowing from the branching portion at the branching portion and allows them to pass through the cooling portion. In such manners, it is easy to equalize the temperature of the cooling medium flowing in a portion closer to a stream lower than the branching portions of the cooling portion so that cooling efficiency improves.

Advantageously, in the combustor, the cooling medium introduction unit includes a first cooling medium introduction unit configured to allow the cooling medium to flow from the connecting portion to the cooling portion and a second cooling medium introduction unit configured to allow the cooling medium to flow from the branching portion to the cooling portion. In such manners, the cooling medium introduction unit can be disposed more flexibly.

Advantageously, in the combustor, the second cooling medium introduction unit and the first cooling medium introduction unit are piled in the mentioned order toward an outside of the transition piece in a radial direction. In such manners, it is possible to reduce an area where a second cooling medium introduction unit is in contact with ambient high temperature air. Therefore, it is possible to prevent temperature rise of the cooling medium inside the second cooling medium introduction unit.

Advantageously, in the combustor, the cooling medium introduction unit includes a thermal barrier layer in an outside surface. In such manners, a thermal barrier layer reduces a quantity of heat conducted to the cooling medium inside the cooling medium introduction unit from air filled inside a casing housing. Therefore, it is possible to prevent temperature rise of the cooling medium inside the cooling medium introduction unit.

Advantageously, in the combustor, the cooling medium introduction unit includes an inner wall configured to surround a portion where the cooling medium is introduced and an outer wall provided outside the inner wall at a predetermined interval. In such manners, an air layer between an inner wall and outer wall reduces the quantity of heat conducted to the cooling medium inside the cooling medium introduction unit from the air filled inside the casing housing. Therefore, it is possible to prevent temperature rise of the cooling medium inside the cooling medium introduction unit.

Advantageously, in the combustor, the cooling medium introduction unit includes a plurality of the cooling medium inlets. In such manners, it is possible to shorten a distance to a position, farthest from each of the cooling medium introduction units, where the temperature is the highest. Therefore, it is possible to decrease the quantity of heat to be applied while the cooling medium flows until it reaches the position where the temperature becomes the highest. Thus, it is possible to efficiently prevent temperature rise at the position where the temperature becomes the highest.

According to another aspect of the invention, a gas turbine comprises: a compressor; the combustor according to any one of the above configured to combust fuel and air compressed by the compressor so as to generate combustion gas; and a turbine driven by supplying the combustion gas from the combustor. The gas turbine includes the aforementioned combustor so that it is possible to prevent deterioration of the cooling performance in a case of cooling the transition piece with the cooling medium.

Advantageous Effects of Invention

The present invention can prevent deterioration of cooling performance in a case of cooling a transition piece included in a combustor of a gas turbine with a cooling medium.

DESCRIPTION OF EMBODIMENTS

A mode (embodiment) for carrying out the present invention will hereinafter be described with reference to the drawings.

Figure 1:
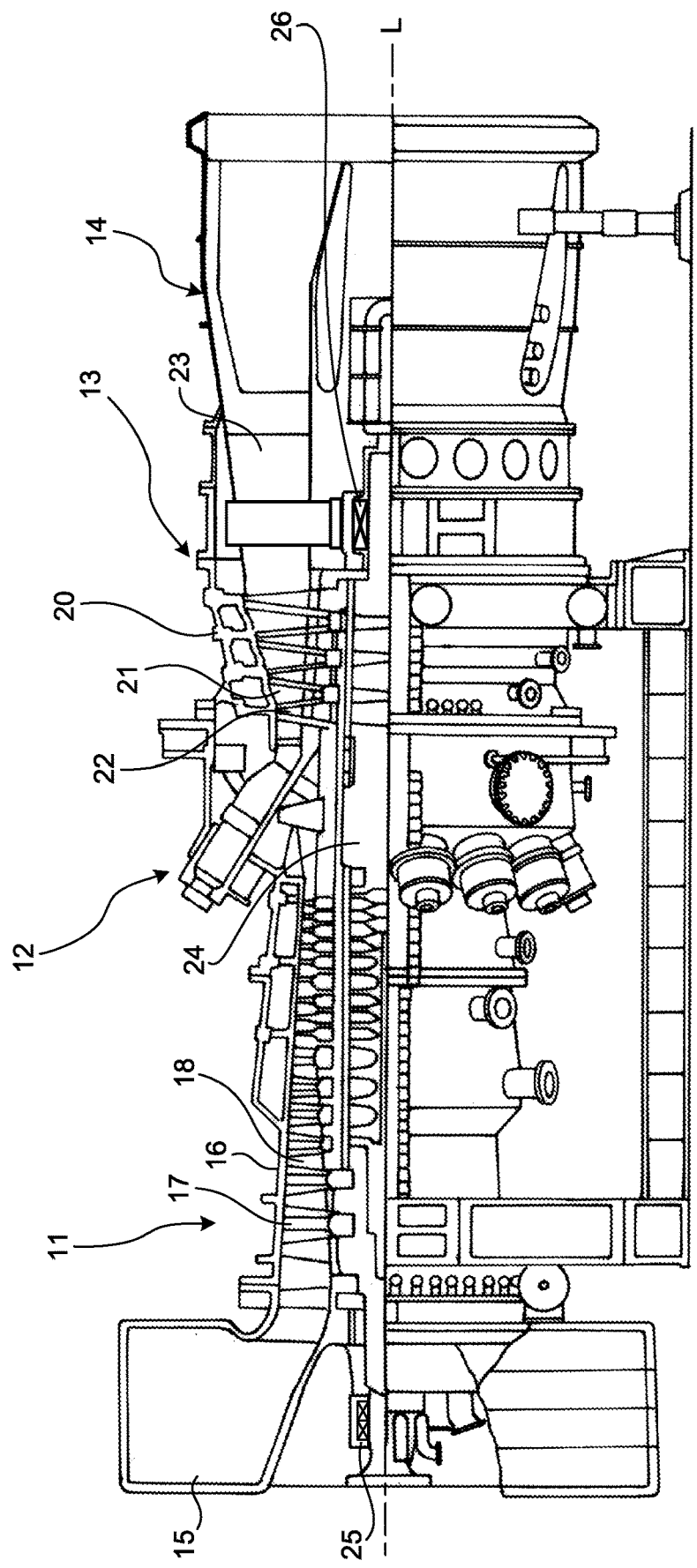
FIG. 1 is a schematic view illustrating a configuration of a gas turbine including a combustor according to an embodiment.

FIG. 1 is a schematic view illustrating a configuration of a gas turbine including a combustor according to the embodiment. As illustrated in FIG. 1, a gas turbine 1 includes a compressor 11, combustor for the gas turbine (hereinafter called combustor) 12, turbine 13, and exhaust chamber 14 in the order mentioned from an upper stream in a flow direction of fluid. The turbine 13 is coupled to, for example, a generator. The gas turbine includes a rotor (turbine shaft) 24 rotatable around a central axis of rotation L.

The compressor 11 includes an air intake 15 configured to take in air. A plurality of stator vanes 17 and rotor blades 18 are alternately disposed inside a compressor casing 16. The combustor 12 supplies fuel to the air (combustion air) compressed by the compressor 11 and ignites the fuel with a burner so as to combust a mixture of the fuel and combustion air and to generate combustion gas. The turbine 13 is provided with a plurality of stator vanes 21 and rotor blades 22 inside a turbine casing 20 alternately disposed toward a downstream from the upstream in the flow direction of the combustion gas as the fluid.

The exhaust chamber 14 includes a exhaust diffuser 23 coupled to the turbine 13. The rotor 24 is disposed to penetrate each center of the compressor 11, combustor 12, turbine 13, and exhaust chamber 14 in a radial direction. An end of the rotor 24 in a compressor 11 side is rotatably supported by a bearing portion 25 centering on the central axis of rotation L. An end of the rotor 24 in a exhaust chamber 14 side is rotatably supported by a bearing portion 26 centering on the central axis of rotation L. A plurality of disk plates is fixed to the rotor 24 and each of rotor blades 18, 22 is coupled to the rotor 24.

In such a gas turbine 1, the air taken in from the air intake 15 of the compressor 11 passes through the plurality of stator vanes 21 and rotor blades 22 so as to be compressed into the high temperature and high pressure compressed air. In the combustor 12, predetermined fuel is supplied to the compressed air so as to form the fuel-air mixture. The fuel-air mixture is combusted in the combustor 12 and changes into the combustion gas. The high temperature and high pressure combustion gas, a working fluid generated in the combustor 12, passes through the plurality of stator vanes 21 and rotor blades 22 included in the turbine 13 and rotates the rotor 24. As the rotor 24 rotates, a generator coupled to the rotor 24 is driven so as to generate electric power. Exhaust gas passing through the rotor 24 is discharged in the air as exhaust gas.

Figure 2:
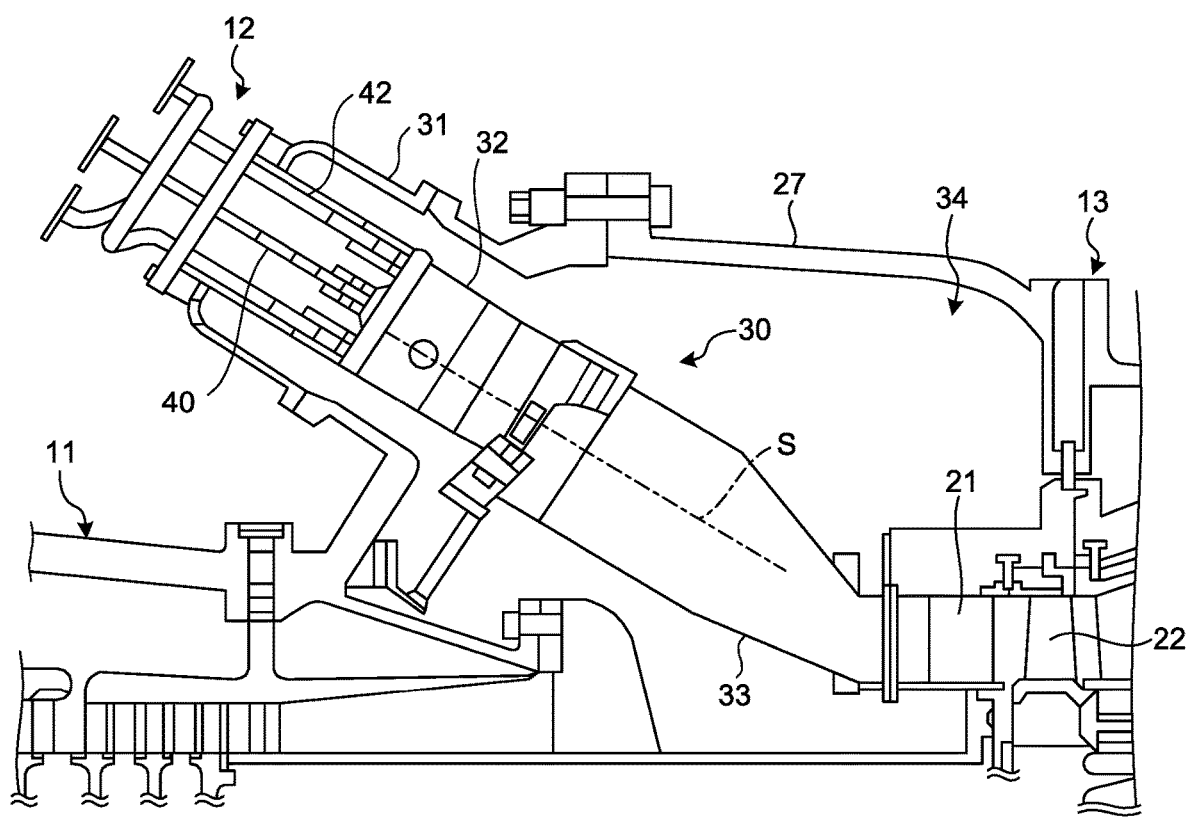
FIG. 2 is an enlarged view of the combustor.

FIG. 2 is an enlarged view of the combustor. The combustor 12 includes a combustor casing 30. The combustor casing 30 includes an inner cylinder 32 disposed inside an external cylinder 31, and a transition piece 33 coupled to a head of the inner cylinder 32. The combustor casing 30 stretches along a central axis S inclined with respect to the central axis of rotation L.

The external cylinder 31 is fastened to a casing housing 27. A base end of the inner cylinder 32 is supported by the external cylinder 31, and the inner cylinder 32 is disposed inside the external cylinder 31 at a predetermined interval left from the external cylinder 31. A pilot burner 40 is provided in a center of the inner cylinder 32 along the central axis S. Around the pilot burner 40, a plurality of main burners 42 is disposed parallel to the pilot burner 40 at regular intervals so as to surround the pilot burner 40. A base end of the transition piece 33 has a cylindrical shape and is coupled to the head of the inner cylinder 32. As approaching a head of the transition piece 33, the transition piece 33 is curved and is made to have a small cross sectional area. The transition piece 33 has an opening facing the stator vane 21 in a first row of the turbine 13. A combustion chamber is included inside the transition piece 33.

Figure 3:
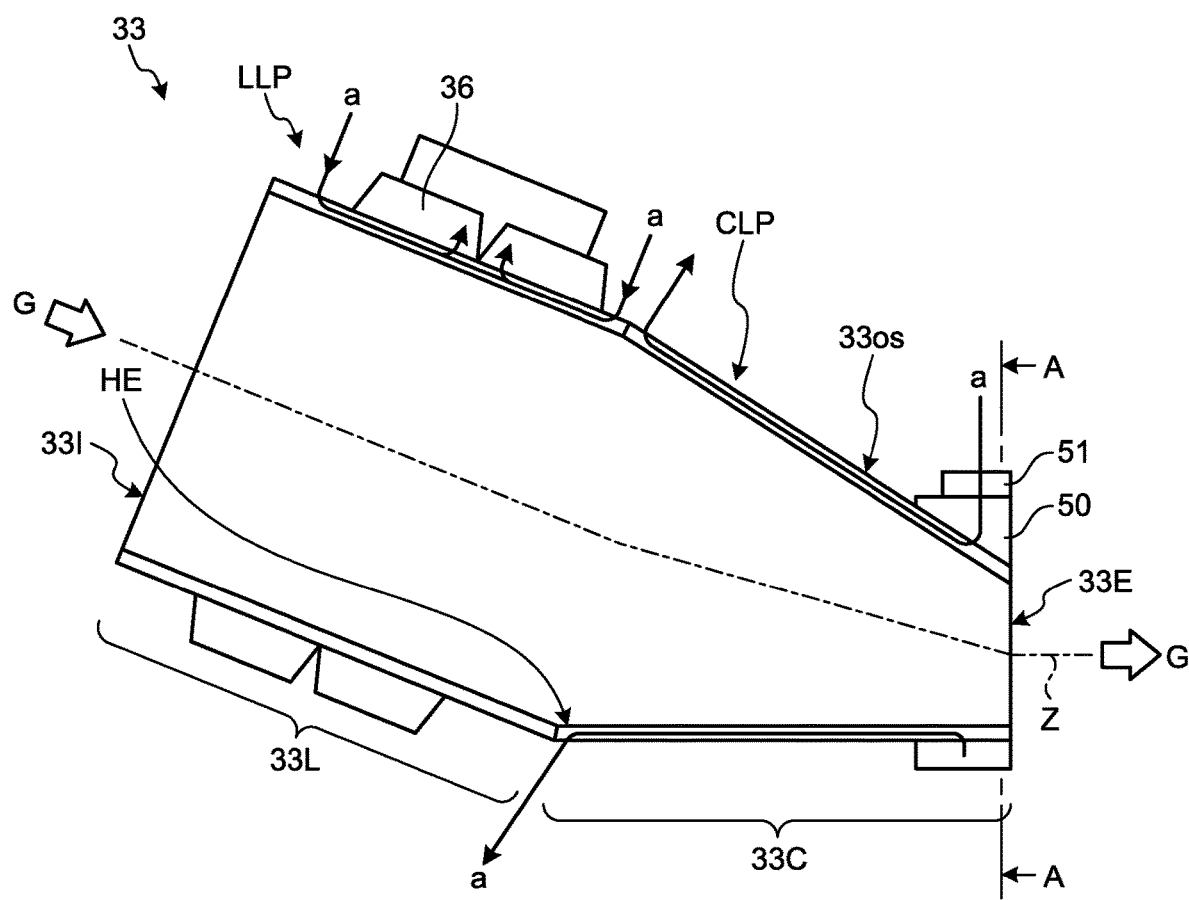
FIG. 3 is a cross sectional view of a transition piece included in the combustor according to the embodiment.
Figure 4:
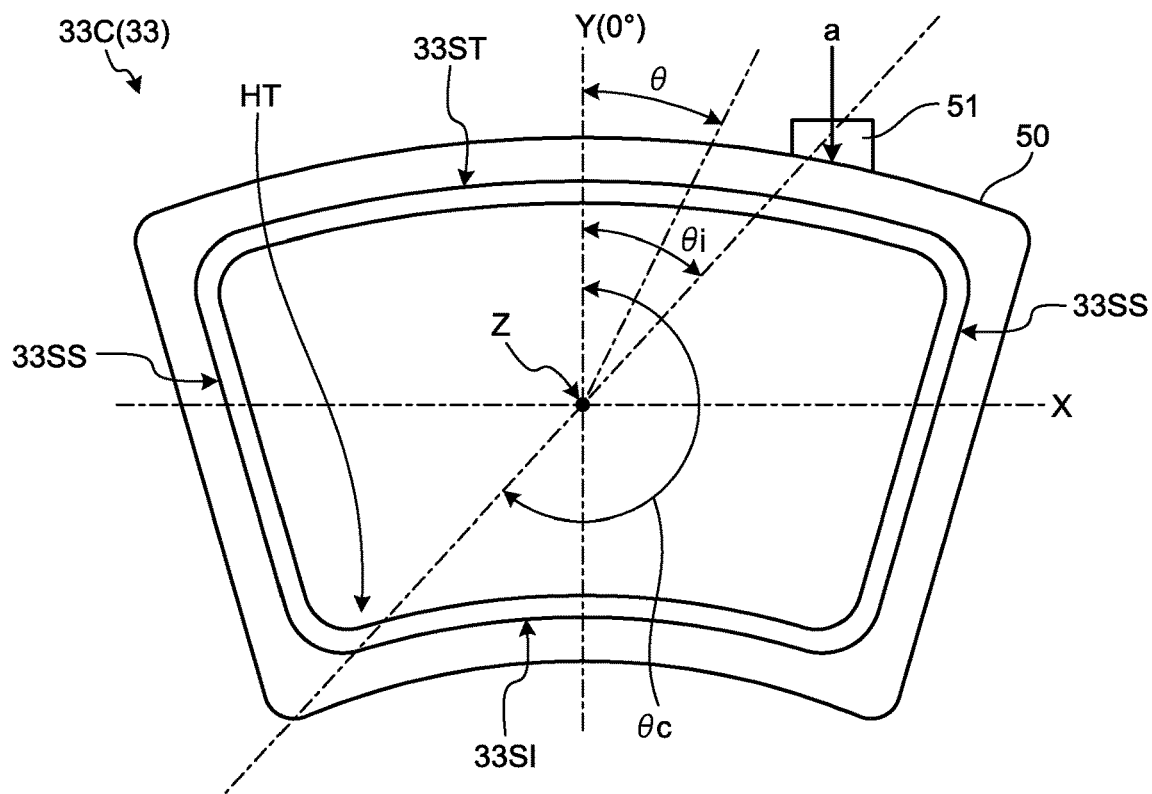
FIG. 4 is a view taken along the line in a direction of an arrow A-A in FIG. 3.

FIG. 3 is a cross sectional view of the transition piece included in the combustor according to the embodiment. FIG. 4 is a view taken along the line in a direction of an arrow A-A in FIG. 3. The transition piece 33 is a cylindrical member including an inlet 33I for the combustion gas G disposed in one end and an outlet 33E for the combustion gas G disposed in the other end. The transition piece 33 allows the combustion gas G flowing from the inlet 33I to flow out of the outlet 33E and introduces the combustion gas F into the turbine 13 illustrated in FIG. 1. The transition piece is provided with acoustic liners 36 disposed in the upper stream of the flow direction of the combustion gas G or the working fluid. In other words, the acoustic liners 36 are disposed in an outer periphery portion of the inlet 33I. This portion is called an acoustic liner zone 33L. In regard to the transition piece 33, as approaching a lower stream of the flow direction of the combustion gas G or as approaching the outlet 33E from an outlet of the acoustic liner zone 33L, the cross sectional area of a passage through which the combustion gas G passes is gradually made small. This portion is called a closed zone 33C. The cross sectional area of the passage through which the combustion gas G passes is a cross sectional area when the transition piece 33 is cut in a plane surface perpendicular to the flow direction of the combustion gas passing through the transition piece 33. An axial line connecting a center of gravity of each cross section of the transition piece 33, in the flow direction of the combustion gas G is a central axis Z of the transition piece 33.

The transition piece 33 is cooled by a cooling medium a. In the present embodiment, the cooling medium a is air but it should not be restricted thereto. The cooling medium a may be, for example, steam. The transition piece 33 includes a cooling portion CLP in the closed zone 33C and a cooling portion LLP in the acoustic liner zone 33L. The cooling portion CLP and cooling portion LLP both include a plurality of cooling medium passages stretching from the outlet 33E of the transition piece 33 toward the inlet 33I. The cooling medium a flows into the plurality of cooling medium passages so as to cool the transition piece 33.

The cooling portion CLP in the closed zone 33C is provided throughout the closed zone 33C in a peripheral direction, that is, within a range from the outlet 33E of the transition piece 33 to a predetermined position toward the inlet 33I. In the present embodiment, the predetermined position represents an end terminal of the acoustic liner zone 33L, that is, a start terminal of the closed zone 33C (a portion of the closed zone 33C closest to the inlet 33I). In the present embodiment, the cooling medium a flows through the cooling portion CLP in the closed zone 33C from the outlet 33E side toward the inlet 33I of the transition piece 33 or toward the acoustic liner zone 33L so as to cool the closed zone 33C of the transition piece 33. The cooling medium a which has flown from the cooling portion CLP in the closed zone 33C and has cooled the transition piece 33 is discharged from the inlet 33I side of the closed zone 33C into the casing housing 27 illustrated in FIG. 2.

As illustrated in FIG. 4, the closed zone 33C has a structure in which four side portions 33ST, 33SI, 33SS, 33SS are combined and whose outer diameter is substantially shaped like a quadratic cylinder. Therefore, a cross sectional shape of the closed zone 33C when it is cut in a plane perpendicular to the central axis Z is substantially a sector form. The side portion 33SI is disposed in a central axis of rotation L side of the gas turbine 1 illustrated in FIG. 1. The side portion 33ST opposing the side portion 33SI is disposed in a position farther from the central axis of rotation L than the side portion 33SI. Two side portion 33SS and side portion 33SS opposing each other connects the side portion 33SI and side portion 33ST.

To illustrate positions in the cross section of the closed zone 33C, a coordinate system X-Y is defined as a two-dimensional coordinate system on a plane perpendicular to the central axis Z of the transition piece 33 which determines the cross section. The origin of the coordinate system X-Y is the central axis Z of the transition piece 33. The positions in the cross section of the closed zone 33C are illustrated by using an angle θ based on the origin of the coordinate system X-Y or the central axis Z. Herein, +Y direction is considered to be 0° and the angle θ is considered to increase from a first quadrant of the coordinate system X-Y toward a fourth quadrant, third quadrant, and second quadrant.

At least a portion in the peripheral direction of an outer periphery portion 33os in the outlet 33E side of the transition piece 33 is provided with a jacket 50 as a cooling medium introduction unit to which the cooling medium a is introduced for cooling the transition piece 33. In the present embodiment, the jacket 50 is provided on the outer periphery portion 33os of the closed zone 33C of the transition piece 33 and is provided adjacent to the outlet 33E. As illustrated in FIG. 4, the jacket 50 is provided on the whole periphery of the outer periphery portion 33os of the closed zone 33C. In other words, the jacket 50 herein is provided on portions with the angle θ ranging from 0° to 360°. However, as mentioned above, the jacket 50 is preferably provided at least to a portion of the transition piece 33 in the peripheral direction.

Figure 6:
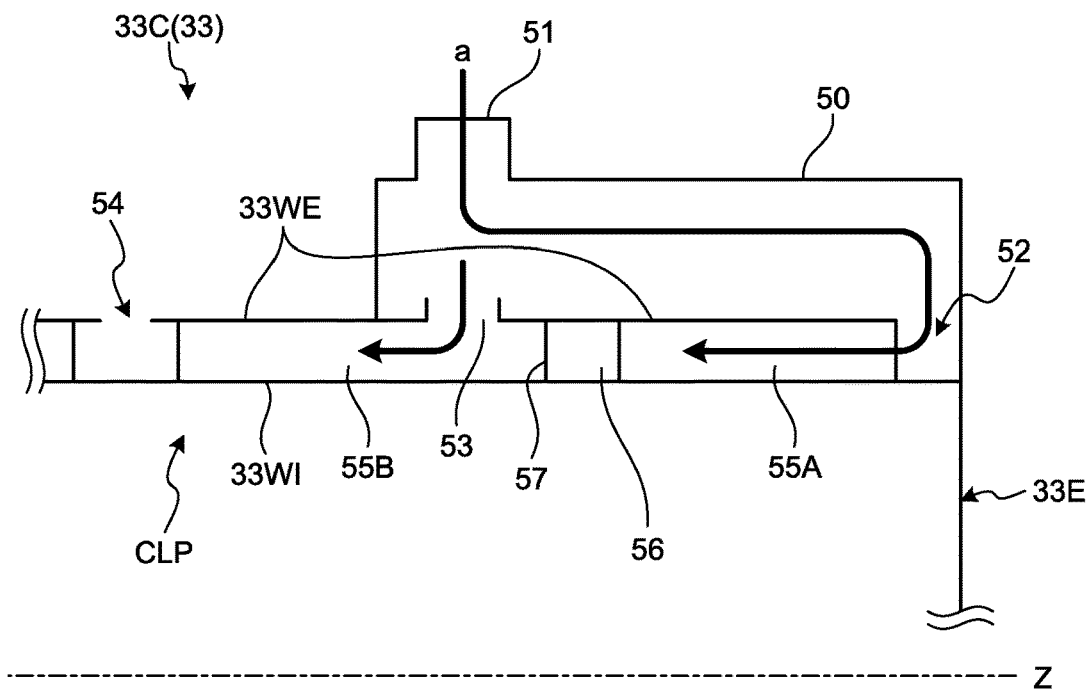
FIG. 6 is a partial cross sectional view illustrating a cooling portion and the jacket of the transition piece included in the combustor according to the embodiment.

The jacket 50 is provided with a cooling medium inlet 51 configured to introduce the cooling medium a into the jacket 50. In the present embodiment, the cooling medium inlet 51 is provided on the side portion 33ST of the closed zone 33C of the transition piece 33. In other words, the cooling medium inlet 51 is provided on the casing housing 27 illustrated in FIG. 2. As illustrated in FIG. 4, an angle of a position where the cooling medium inlet 51 is disposed is θi. As illustrated in FIG. 6, the cooling medium a introduced from the cooling medium inlet 51 into the jacket 50 flows toward the outlet 33E side from the inlet 33I side of the transition piece 33 illustrated in FIG. 3. Then, the cooling medium a flows into the cooling portion CLP in the closed zone 33C and cools the closed zone 33C while flowing toward the acoustic liner zone 33L illustrated in FIG. 3. The cooling medium inlet 51 cannot be provided on an end surface in the outlet 33E side of the transition piece 33 since other members included in the gas turbine 1 are provided in the same place. Therefore, the cooling medium inlet 51 is provided to the inlet 33I side but not to the outlet 33E side of the transition piece 33.

In the present embodiment, the cooling medium inlet 51 which introduces the cooling medium a into the jacket 50 is at a single portion of the closed zone 33C in the peripheral direction. Therefore, taking the whole peripheral direction of the closed zone 33C into consideration, there are a portion close to the cooling medium inlet 51 and a portion far from the cooling medium inlet 51. The portion farthest from the cooling medium inlet 51 is a portion HT whose angle θ from the cooling medium inlet 51 is 180°. The angle of the portion HT is θc, and θc≈θi+180°.

Generally, a temperature of the cooling medium a is lower than a temperature of air filled in an inner portion 34 (see FIG. 2) of the casing housing 27 disposed around the jacket 50 which supplies the cooling medium a to the cooling portion CLP in the closed zone 33C. Therefore, heat is conducted to the jacket 50 from the air inside the inner portion 34 of the casing housing 27, which raises the temperature of the cooling medium a inside the jacket 50. Accordingly, the cooling medium a having low temperature and high cooling performance can be used in the portion close to the cooling medium inlet 51, whereas only the cooling medium a having high temperature and low cooling performance can be used in the portion far from the cooling medium inlet 51.

Figure 5:
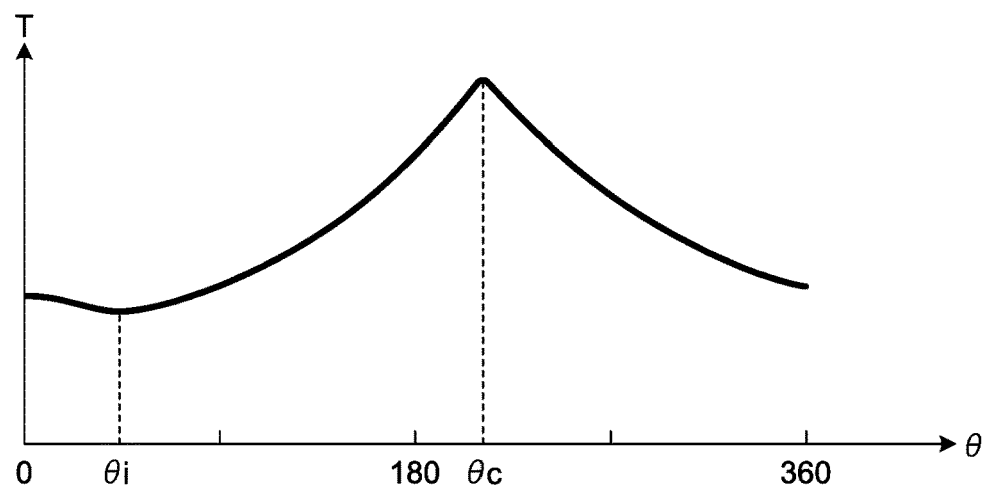
FIG. 5 is a view illustrating temperature distribution of a cooling medium inside a jacket provided in a closed zone of the transition piece.

FIG. 5 is a view illustrating temperature distribution of the cooling medium inside the jacket provided in the closed zone of the transition piece. The temperature T is taken along the ordinate and the angle θ is taken along the abscissa in FIG. 5. As mentioned above, the cooling medium inlet 51 is at the single portion. Therefore, the temperature of the cooling medium a inside the jacket 50 is the lowest in the cooling medium inlet 51 as illustrated in FIG. 5. The farther the distance from the cooling medium inlet 51, the higher the temperature rises. The temperature of the cooling medium a is the highest in the portion HT (θ≈θc) which is farthest from the cooling medium inlet 51.

In such manners, the temperature of the cooling medium a inside the jacket 50 differs depending on the positions from the cooling medium inlet 51. Therefore, the cooling performance of the cooling medium a flowing from the jacket 50 into the cooling portion CLP varies depending on the positions from the cooling medium inlet 51 of the jacket 50. The cooling performance of the cooling medium a deteriorates especially at the portion far from the cooling medium inlet 51 (in the vicinity of the portion HT).

In general, the cooling medium a flowing into the cooling portion CLP of the transition piece 33 cools the transition piece 33 while flowing through the cooling portion CLP and raises its temperature. Therefore, in the transition piece 33 or in the central axis Z direction of the closed zone 33C herein, the temperature of the cooling medium a becomes the highest in a portion HE near an outlet where the cooling medium a is discharged from the cooling portion CLP.

In the cross section cut in the plane perpendicular to the central axis Z, the temperature of the transition piece 33 is the highest in the portion far from the cooling medium inlet 51 (a portion in the vicinity of the farthest portion HT). In the central axis Z direction, the temperature is the highest in the portion HE near the outlet of the cooling portion CLP. Therefore, a life-span of the transition piece 33 depends on the cooling performance of the farthest portion HT in the cross section and depends on the portion HE near the outlet of the cooling portion CLP in the central axis Z direction. Accordingly, if it is possible to improve the cooling performance in the portion HT in the cross section of the transition piece 33 and the portion HE in the central axis Z direction, a life-span of the combustor 12, more specifically, the life-span of the transition piece 33 can be extended or an amount of flow of the cooling medium a can be reduced and the performance of the gas turbine 1 can be improved.

Figure 7:
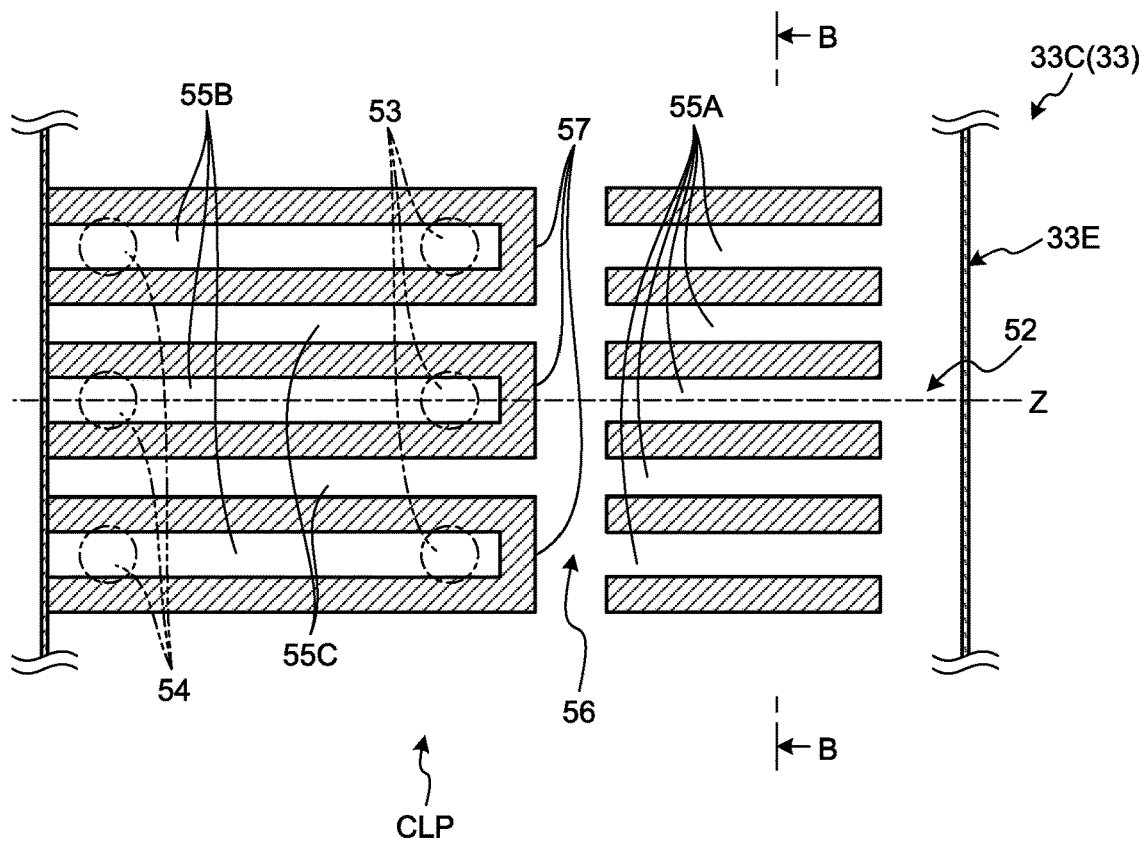
FIG. 7 is a plane view illustrating the cooling portion and jacket of the transition piece included in the combustor according to the embodiment.
Figure 8:
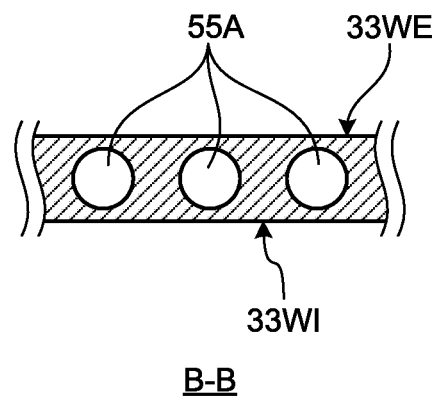
FIG. 8 is a view taken along the line in a direction of an arrow B-B in FIG. 7.

FIG. 6 is a partial cross sectional view illustrating the cooling portion and jacket of the transition piece included in the combustor according to the embodiment. FIG. 7 is a plane view illustrating the cooling portion and jacket of the transition piece included in the combustor according to the embodiment. FIG. 8 is a view taken along the line in a direction of an arrow B-B in FIG. 7. In the present embodiment, in order to improve the cooling performance of the portion HT in the cross section of the transition piece 33 and the cooling performance of the portion HE in the central axis Z direction, the transition piece 33 includes branching portions 53 configured to flow the cooling medium a inside the jacket 50 into the cooling portion CLP at portions closer to the inlet 33I of the transition piece 33 than a connecting portion 52 of the cooling portion CLP and jacket 50. Due to the branching portions 53, the cooling medium a having low temperature and high cooling performance can flow into the portion HE and portion HT where the temperature of the cooling medium a has risen and the cooling performance has deteriorated. Thus, it is possible to prevent deterioration of the cooling performance at the portion HE and portion HT. Therefore, it is possible to achieve performance improvement due to reduction in the amount of flow of the cooling medium a or to achieve lifetime extension due to reduction in the temperature rise of the transition piece 33. Hereafter, configurations of the jacket 50, cooling portion CLP, and branching portions 53 will be described in detail.

As illustrated in FIG. 6 and FIG. 7, between an inner wall 33WI and outer wall 33WE, the cooling portion CLP included in the closed zone 33C of the transition piece 33 includes a plurality of passages 55A, passages 55B, and passages 55C through which the cooling medium a passes. Hereinafter, the passages 55A are called first passages 55A, the passages 55B are called second passages 55B, and the passages 55C are called third passages 55C for convenience sake. As illustrated in FIG. 6 and FIG. 7, the first passages 55A, second passages 55B, and third passages 55C are stretching in the central axis Z direction of the transition piece 33. The first passages 55A are provided to the outlet 33E side of the transition piece 33 illustrated in FIG. 3. The second passages 55B and third passages 55C are provided to the inlet 33I side of the transition piece 33.

In the present embodiment, a cross sectional shape of each of first passages 55A is circular as illustrated in FIG. 8. A cross sectional shape of each of second passages 55B and each of third passages 55C is circular as similar to each of the first passages 55A. The cross sectional shape of each of the first passages 55A, second passage 55B, and third passage 55C should not be restricted to the circular shape, but it may be rectangular and the like.

The first passages 55A are connected to the jacket 50 at the connecting portion 52 and the cooling medium a inside the jacket 50 flows into the first passages 55A. A plurality of second passages 55B and third passages 55C are provided to the inlet 33I side of the transition piece 33 illustrated in FIG. 3. A first passage 55A side of each of the second passages 55B is blocked by a blocking member 57. Each of the third passages 55C has an opening in the first passage 55A side. An interspace 56 is provided between the plurality of first passages 55A and the plurality of second passages 55B and third passages 55C along the peripheral direction of the closed zone 33C.

Due to such configuration, the cooling medium a passing through the connecting portion 52 from the jacket 50 and flowing into the first passages 55A flows out of the first passages 55A and flows into the interspace 56, thereby flowing into the third passages 55C from the interspace 56. While passing through the first passages 55A and third passages 55C, the cooling medium a cools the closed zone 33C of the transition piece 33.

As illustrated in FIG. 6 and FIG. 7, the branching portions 53 are provided on the outer wall 33WE of the transition piece 33 where the second passages 55B are disposed. In the present embodiment, the branching portions 53 are through holes which penetrate the outer wall 33WE and connect an inner portion of the jacket 50 and the second passages 55B. The branching portions 53 are provided on portions closer to the inlet 33I of the transition piece 33 illustrated in FIG. 3 than the connecting portion 52. Due to such a configuration, the branching portions 53 can allow the cooling medium a in a stream of the flow direction of the cooling medium a upper than the connecting portion 52 to flow into the second passages 55B at the stream upper than the connecting portion 52.

The cooling medium a flowing into the second passages 55B cools the closed zone 33C of the transition piece 33 while passing through the second passages 55B. The cooling medium a passing through the second passages 55B and third passages 55C flows out of cooling medium outlets 54 provided on the outer wall 33WE of the closed zone 33C of the transition piece 33 and flows into the inner portion 34 of the casing housing 27 illustrated in FIG. 2. The cooling medium outlets 54 are provided to a lower stream side of the flow direction of the cooling medium a flowing through the second passages 55B and third passages 55C, that is, the inlet 33I side of the transition piece 33 illustrated in FIG. 3.

The branching portions 53 allow some of the cooling medium a inside the jacket 50 to flow into the second passages 55B of the cooling portion CLP at the portions closer to the inlet 33I of the transition piece 33 than the connecting portion 52. Therefore, the branching portions 53 can allow the cooling medium a having low temperature and high cooling performance to flow from the second passages 55B into the portions in the transition piece 33 where the temperature becomes the highest (the portion HE illustrated in FIG. 3 and the portion HT illustrated in FIG. 4, hereinafter called maximum temperature portions). Thus, the branching portions 53 can prevent deterioration of the cooling performance in the maximum temperature portions.

The branching portions 53 can decrease the amount of flow of the cooling medium a in the outlet 33E side of the transition piece 33 where the temperature of the transition piece 33 relatively has an allowance and the branching portions 53 can equalize the temperature of the whole transition piece 33 (specifically, the closed zone 33C). Accordingly, an extreme temperature rise of the cooling medium a is prevented so that the amount of flow of the cooling medium a is decreased and the performance of the gas turbine 1 is improved. When the amount of flow of the cooling medium a is set to be equivalent to an amount of flow in a case of not providing the branching portions 53, the temperature rise of the whole transition piece 33 can be prevented and the lifetime expansion of the transition piece 33 can be achieved. The transition piece 33 just allows the cooling medium a inside the jacket 50 to flow from the branching portions 53 into the second passages 55B, and the shapes of the first passages 55A, second passages 55B, and third passages 55C included in the cooling portion CLP should not be changed. Therefore, pressure loss in the cooling portion CLP may not be increased, which prevents performance deterioration of the gas turbine 1 including the cooling portion CLP.

The branching portions 53 are preferably provided at least to predetermined areas in the peripheral direction of the transition piece 33 including the portions farthest from the cooling medium inlet 51 of the jacket 50, that is, the maximum temperature portions. In the present embodiment, the maximum temperature portions of the closed zone 33C of the transition piece 33 are in the side portion 33SI in the central axis of rotation L side illustrated in FIG. 4. Therefore, the branching portions 53 are provided at least to the cooling portion CLP provided on the side portion 33SI. In such manners, the number of the branching portions 53 can be minimized so that it is possible to prevent an amount of reduction in the amount of flow of the cooling medium a in the outlet 33E side of the transition piece 33 where the temperature of the transition piece 33 relatively has the allowance.

The branching portions 53 may be provided in the whole peripheral direction of the closed zone 33C, that is, side portions 33SI, 33SI, 33SS, 33SS. Supposed that the branching portions 53 are provided on any one of these portions, the side portion 33SI including the maximum temperature portions is preferable.

In a case of not providing any branching portion 53, the blocking members 57 included in the second passages 55B illustrated in FIG. 6 may not be provided. In such a case, the interspace 56 is not provided as well and the first passages 55A, second passages 55B, and third passages 55C may be combined to one continuous passage.

At least one of the number and size of the branching portions 53 is changed, an area where the cooling medium a passes through the branching portions 53 is changed (hereinafter called a branching portion area). The change in the branching portion area also changes the amount of flow of the cooling medium a passing through the branching portions 53 and the amount of reduction in the amount of flow of the cooling medium a in the outlet 33E side of the transition piece 33. In such manners, the change at least in one of the number and size of the branching portions 53 also changes a ratio between the amount of flow of the cooling medium a flowing through the second passages 55B and the amount of flow of the cooling medium a flowing through the first passages 55A. By changing at least one of the number and size of the branching portions 53 depending on specifications and the like of the gas turbine 1, the amount of flow of the cooling medium a flowing through the second passages 55B and the amount of flow of the cooling medium a flowing through the first passages 55A can be set appropriately so as to cool the whole transition piece 33 appropriately.

The branching portions 53 may also be provided concentrically to a portion, within the transition piece 33 which should to be cooled, in the peripheral direction of the transition piece 33. In other words, the branching portions 53 may be provided concentrically to the portion HT illustrated in FIG. 4. Furthermore, the branching portions 53 provided on the portion, within the transition piece 33 which should to be cooled, in the peripheral direction of the transition piece 33 may be made larger than other portions, or the number of the branching portions 53 per unit area may be made large. In such manners, it is possible to surely and sufficiently supply the cooling medium a having the high cooling performance and low temperature to the maximum temperature portions. Therefore, it is possible to surely and efficiently cool the maximum temperature portions. The branching portions 53 may be provided in a plurality of positions in the central axis Z direction of the transition piece 33.

In regard to the portions where the second passages 55B and third passages 55C are provided alternately, the second passages 55B only allow the cooling medium a flowing from the branching portions 53 to pass through the portions, and the third passages 55C allow the cooling medium a flowing into the first passages 55A from the connecting portion 52 and flowing out of the first passages 55A to pass through the portions. In other words, the cooling portion CLP separates the cooling medium a flowing into the first passages 55A from the connecting portion 52 and the cooling medium a flowing into the second passages 55B from the branching portions 53, and the cooling portion CLP allows those cooling media a to pass through the cooling portion CLP. In such manners, the amount of flow of the cooling medium a passing through the first passages 55A and the amount of flow of the cooling medium a passing through the second passages 55B can be controlled easily.

(First Modification)

The cooling portion CLP in the aforementioned embodiment separates the cooling medium a flowing into the first passages 55A and the cooling medium a flowing into the second passages 55B, and the cooling portion CLP allows those cooling media a to pass through the cooling portion CLP. However, the cooling medium a flowing from the connecting portion 52 and the cooling medium a flowing from the branching portions 53 may be mixed at the branching portion 53 so as to pass through the cooling portion CLP. In such a case, the second passages 55B do not include the blocking members 57 illustrated in FIG. 6 and FIG. 7. Due to such a configuration, the cooling medium a flowing out of the first passages 55A disposed in positions opposing the second passages 55B flows into the second passages 55B. The cooling medium a flowing from the branching portions 53 flows into the second passages 55B. Therefore, the cooling medium a flowing from the first passages 55A and the cooling medium a flowing from the branching portions 53 are mixed at the branching portions 53 and pass through the second passages 55B.

Figure 9:
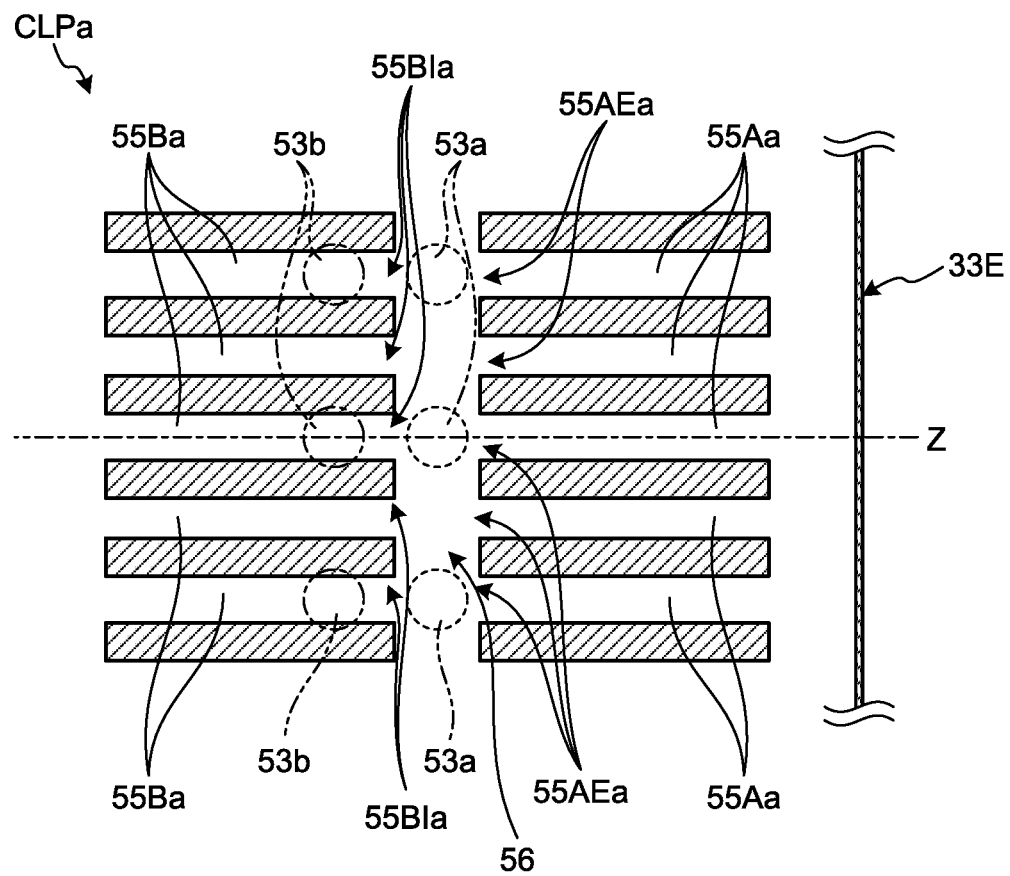
FIG. 9 is a view illustrating another example of a first modification.

FIG. 9 is a view illustrating another example of a first modification. A cooling portion CLPa illustrated in FIG. 9 includes first passages 55Aa and second passages 55Ba. All the second passages 55Ba have openings in portions opposing outlets of the first passages 55Aa. Outlets 55AEa of the first passages 55Aa and inlets 55BIa of the second passages 55Ba sandwiching an interspace 56 are opposing each other. Due to such a configuration, a cooling medium a flowing from a connecting portion 52 to the first passages 55A and flowing out of the outlets 55AEa to the interspace 56 flows from the inlets 55BIa of all the second passages 55Ba.

The cooling portion CLPa includes branching portions 53a at positions opposing the interspace 56. The branching portions 53a allow some of the cooling medium a flowing from the jacket 50 illustrated in FIG. 6 to flow into the interspace 56. The cooling medium a flowing from the branching portions 53a is mixed at the branching portions 53a with the cooling medium a flowing from the first passages 55A and then flows into the second passages 55Ba from the inlets 55BIa of the second passages 55Ba.

In regard to the cooling portion CLPa, instead of the branching portions 53a being provided on the portions opposing the interspace 56, branching portions 53b may be provided as striding over the adjacent second passages 55Ba, 55Ba. In such manners, the cooling medium a flowing from the branching portions 53b to the second passages 55Ba is mixed at the branching portions 53b with the cooling medium a passing through the first passages 55Aa and then passes through the second passages 55Ba. In a case of providing the branching portions 53b striding over the adjacent second passages 55Ba, 55Ba, the first passages 55Aa and second passages 55Ba may be provided continuously without involving the interspace 56.

In the present modification, the cooling medium a flowing from the connecting portion 52 and the cooling medium a flowing from the branching portions 53, 53a, 53b are combined at the branching portions 53, 53a, 53b and then passes through the cooling portions CLP, CLPa. In such a case, it is not necessary to separate the cooling medium a flowing from the connecting portion 52 and the cooling medium a flowing from the branching portions 53, 53a, 53b. Therefore, structures of the cooling portions CLP, CLPa can be simplified. Furthermore, by mixing the cooling medium a flowing from the connecting portion 52 and the cooling medium a flowing from the branching portions 53, 53a, 53b at the branching portions 53, 53a, 53b, temperatures of these cooling media a can be equalized easily. Equalization in the temperatures of the cooling medias a is such an advantage that cooling efficiency improves.

(Second Modification)

Figure 10:
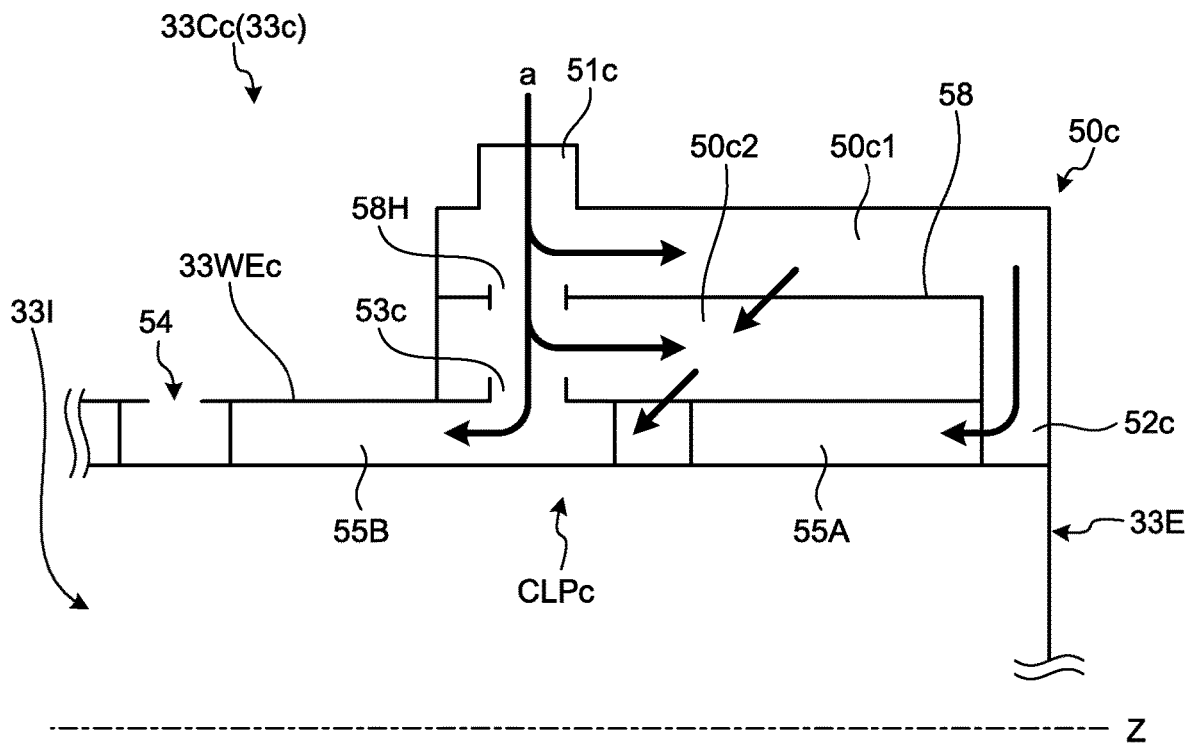
FIG. 10 is a partial cross sectional view illustrating a cooling portion and jacket of a transition piece included in a combustor according to a second modification of the embodiment.

FIG. 10 is a partial cross sectional view illustrating a cooling portion and jacket of a transition piece included in a combustor according to a second modification of the embodiment. A jacket 50c provided in a closed zone 33Cc of a transition piece 33c includes a first jacket 50c1 as a first cooling medium introduction unit and a second jacket 50c2 as a second cooling medium introduction unit. Other configurations are similar to the jacket 50 according to the embodiment illustrated in FIG. 6. In regard to structures of a cooling portion CLPc and branching portion 53c, the structures in the aforementioned embodiment or those in the first modification are applicable.

The first jacket 50c1 allows a cooling medium a to flow from a connecting portion 52c to the cooling portion CLPc. The second jacket 50c2 allows the cooling medium a to flow from the branching portion 53c to the cooling portion CLPc. The first jacket 50c1 and second jacket 50c2 are provided adjacently. Between the first jacket 50c1 and second jacket 50c2, a partitioning portion 58 is provided which partitions those jackets. The partitioning portion 58 is provided with a cooling medium passage 58H which penetrates the partitioning portion 58 and connects the first jacket 50c1 and second jacket 50c2.

The first jacket 50c1 is provided with a cooling medium inlet 51c. The cooling medium a introduced from the cooling medium inlet 51c flows into the first jacket 50c1. Some of the cooling medium a passes through the connecting portion 52c and flows into a first passage 55A, and some of them passes through the cooling medium passage 58H and flows into the second jacket 50c2.

The second jacket 50c2 is provided on an outer wall 33WEc of the closed zone 33Cc of the transition piece 33c. The branching portion 53c is provided on a portion of the outer wall 33WEc surrounded by the second jacket 50c2. The branching portion 53c penetrates the outer wall 33WEc and connects the second passage 55B and second jacket 50c2. The cooling medium a inside the second jacket 50c2 passes through the branching portion 53c and flows into the second passage 55B.

As illustrated in FIG. 10, the second jacket 50c2 and first jacket 50c1 are piled in the order mentioned toward an outside of the transition piece 33c in a radial direction. In regard to the first jacket 50c1, an outside surface of the transition piece 33c in the radial direction and a side surface perpendicular to the central axis Z of the transition piece 33 are in contact with the air filled in the inner portion 34 of the casing housing 27 illustrated in FIG. 2. On the other hand, in regard to the second jacket 50c2, only a side surface perpendicular to the central axis Z of the transition piece 33 is in contact with the air filled in the inner portion 34 of the casing housing 27. Therefore, in regard to the second jacket 50c2, an area in contact with the air filled in the inner portion 34 of the casing housing 27 is smaller than the first jacket 50c1. Thus, temperature rise of the cooling medium a inside the second jacket 50c2 can be prevented compared to the cooling medium a inside the first jacket 50c1.

In the present modification, the cooling medium a having a temperature lower than the cooling medium a inside the first jacket 50c1 can be supplied to the cooling portion CLPc from the second jacket 50c2 through the branching portion 53c. Therefore, the jacket 50c, branching portion 53c, and cooling portion CLPc impart the maximum temperature portions with the cooling medium a having high cooling performance and low temperature so as to cool the maximum temperature portions more efficiently.

In the present modification, the first jacket 50c1 and second jacket 50c2 are layered toward the outside of the transition piece 33c in the radial direction. However, the first jacket 50c1 may be provided to the outlet 33E side of the transition piece 33c and the second jacket 50c may be provided to the cooling medium outlet 54 side. In such a case, the first jacket 50c1 and second jacket 50c2 each may be supplied with the cooling medium a. Alternatively, the first jacket 50c1 and second jacket 50c2 may be coupled by a tube and the like, and one of them may be supplied with the cooling medium a so that both can be supplied with the cooling medium a.

In the present embodiment, the jacket 50c is divided into two, that is, the first jacket 50c1 and second jacket 50c2. However, the number of division of the jacket 50c should not be restricted to two. In a case where it is difficult to provide the jacket 50c to the transition piece 33 since other members are provided in the same place, the jacket 50c can be divided into plural pieces so that it can be disposed more flexibly.

(Third Modification)

Figure 11:
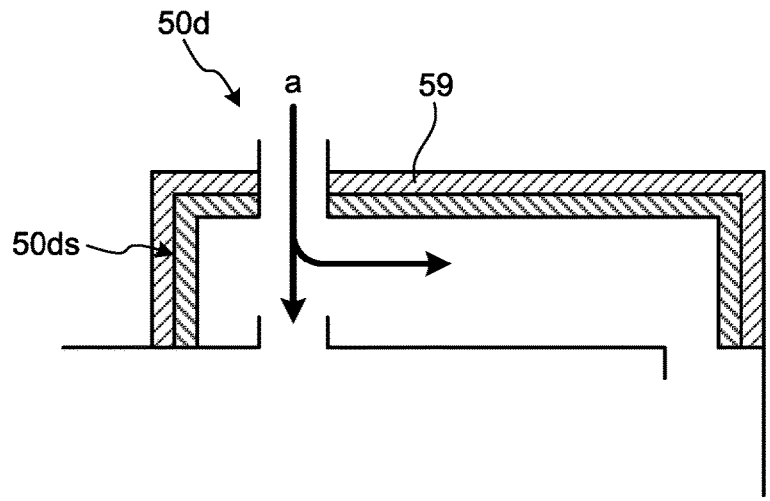
FIG. 11 is a view for describing a jacket according to a third modification of the embodiment.
Figure 12:
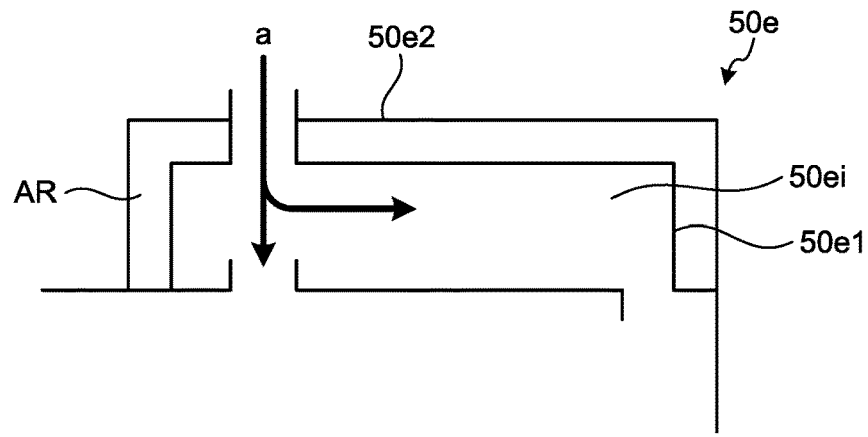
FIG. 12 is a view for describing the jacket according to the third modification of the embodiment.

FIG. 11 and FIG. 12 are views for describing a jacket according to a third modification of the embodiment. A jacket 50d illustrated in FIG. 11 includes a thermal barrier layer 59 in an outside surface 50ds. The thermal barrier layer 59 is, for example, a ceramic coating layer. In such manners, it is possible to reduce a quantity of heat conducted to a cooling medium a inside the jacket 50d from the air filled in the inner portion 34 of the casing housing 27 illustrated in FIG. 2. Therefore, it is possible to prevent temperature rise of the cooling medium a inside the jacket 50d. Thus, the jacket 50d imparts maximum temperature portions with the cooling medium a having high cooling performance and low temperature so as to cool the maximum temperature portions more efficiently.

A jacket 50e illustrated in FIG. 12 includes an inner wall 50e1 and outer wall 50e2. The inner wall 50e1 surrounds a portion 50ei where the cooling medium a is introduced, and the outer wall 50e2 is provided outside the inner wall 50e1 at a predetermined interval. Due to such a configuration, an air layer AR is formed between the inner wall 50e1 and outer wall 50e2 in the jacket 50e. The air layer AR performs as a heat insulating layer. Therefore, the air layer AR reduces the quantity of heat conducted to the cooling medium a inside the jacket 50e from the air filled in the inner portion 34 of the casing housing 27 illustrated in FIG. 2. Accordingly, it is possible to prevent the temperature rise of the cooling medium a inside the jacket 50e. Thus, the jacket 50e imparts the maximum temperature portions with the cooling medium a having high cooling performance and low temperature so as to cool the maximum temperature portions more efficiently.

Furthermore, a thickness of the jacket 50 illustrated in FIG. 6 may be made large. In such manners, it is also possible to reduce the quantity of heat conducted to the cooling medium inside the jacket 50 from the air filled in the inner portion 34 of the casing housing 27 illustrated in FIG. 2. Therefore, it is possible to prevent the temperature rise of the cooling medium a inside the jacket 50.

(Fourth Modification)

Figure 13:
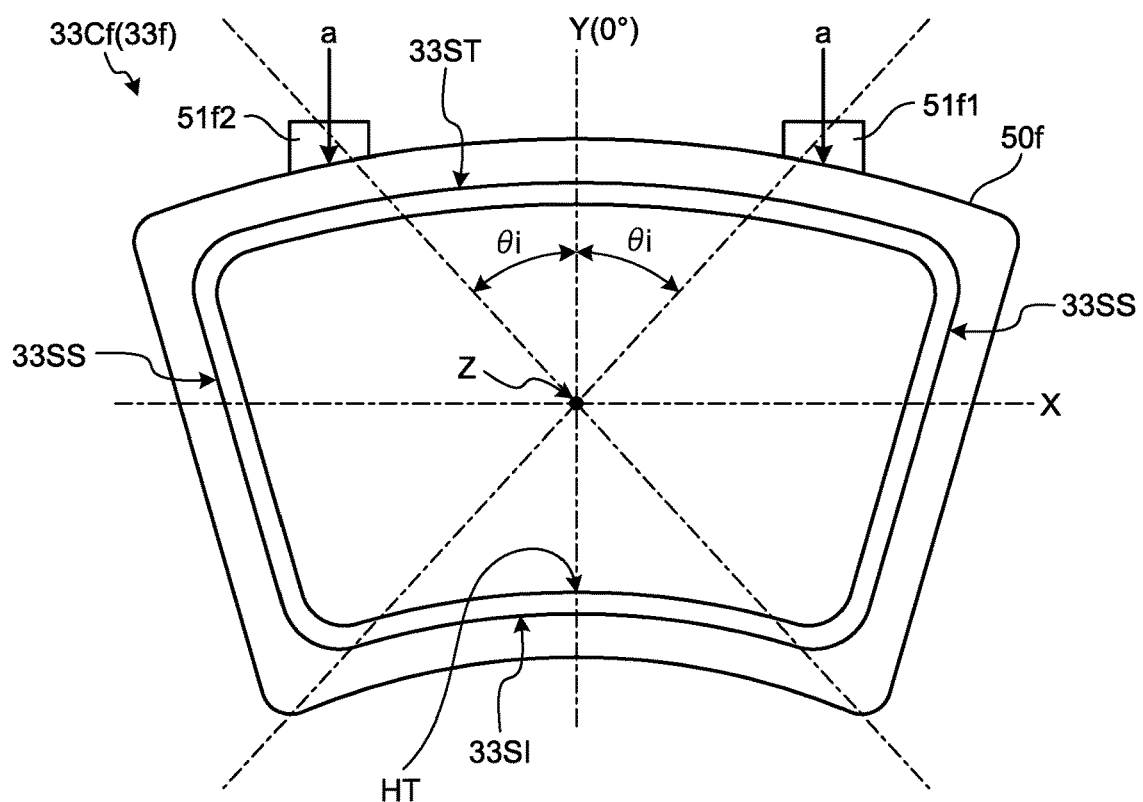
FIG. 13 is a view illustrating a transition piece according to a fourth modification of the embodiment.

FIG. 13 is a view illustrating a transition piece according to a second modification of the embodiment. FIG. 13 illustrates a portion of a transition piece 33f corresponding to the view taken along the line in the direction of the arrow A-A in FIG. 3. A closed zone 33Cf is different from the closed zone 33C of the transition piece 33 illustrated in FIG. 4 in that the closed zone 33Cf of the transition piece 33f includes a plurality of cooling medium inlets 51f1, 51f2 (the number in the present modification is two, but it should not be restricted thereto). Other structures are similar to those of the closed zone 33C of the transition piece 33 illustrated in FIG. 4.

Two cooling medium inlets 51f1, 51f2 are provided on a side portion 33ST which is opposing a side portion 33SI and is disposed in a position farther from the central axis of rotation L than the side portion 33SI. The cooling medium inlets 51f1, 51f2 are provided in such a portion at a predetermined interval along a peripheral direction of the closed zone 33Cf of the transition piece 33f. In the present embodiment, two cooling medium inlets 51f1, 51f2 sandwiching a Y-axis are provided in positions each having an angle of θi. In other words, distances from the Y-axis to each of the cooling medium inlets 51f1, 51f2 are similar.

In regard to a cooling medium a flowing from the cooling medium inlet 51f1, some of them flows along one side portion 33SS and along the side portion 33SI toward a direction apart from the cooling medium inlet 51f2, and the remaining cooling medium a flows along the side portion 33ST toward a direction approaching the cooling medium inlet 51f2. In regard to a cooling medium a flowing from the cooling medium inlet 51f2, some of them flows along the other side portion 33SS and along the side portion 33SI toward a direction apart from the cooling medium inlet 51f1, and the remaining cooling medium a flows along the side portion 33ST toward a direction approaching the cooling medium inlet 51f1.

The cooling medium a flowing from the cooling medium inlet 51f1 along one side portion 33SS and the cooing medium a flowing from the cooling medium inlet 51f2 along the other side portion 33SS join in the vicinity of a central portion of the side portion 33SI. In the present modification, a portion HT which is the farthest portion from each of the cooling medium inlets 51f1, 51f2 is a portion where the cooling media a flowing from both sides join. A temperature in this portion is the highest.

In regard to the closed zone 33Cf of the transition piece 33f, distances from the cooling medium inlets 51f1, 51f2 to the farthest portion HT is smaller than those in the closed zone 33C of the transition piece 33 illustrated in FIG. 4. Therefore, a quantity of heat applied to the cooling media a flowing from the cooling medium inlets 51f1, 51f2 until they reach the farthest portion HT is smaller than the quantity of head in the closed zone 33C of the transition piece 33 illustrated in FIG. 4. In other words, when the cooling media a flowing from the cooling medium inlets 51f1, 51f2 reach the farthest portion HT, a degree of temperature rise is smaller than that in the closed zone 33C of the transition piece 33 illustrated in FIG. 4. Thus, the closed zone 33Cf of the transition piece 33f including the plurality of cooling medium inlets 51f1, 51f2 can efficiently prevent the temperature rise of the portion HT farthest from the cooling medium inlets 51f1, 51f2.

The embodiment and modifications thereof have been described as per above, but it should be noted that the embodiment and modifications thereof should not be restricted to those mentioned above. It should be noted that structural elements in the embodiment and modifications thereof involve elements which can be easily assumed by those skilled in the art, elements which is substantially similar to the elements described herein, and elements which is within a similar range. Furthermore, the structural elements can be combined appropriately. Still further, the structural elements can be omitted, substituted, or modified within the gist of the embodiment and modifications thereof.

REFERENCE SIGNS LIST

1 GAS TURBINE
11 COMPRESSOR
12 COMBUSTOR
13 TURBINE
14 EXHAUST CHAMBER
15 AIR INTAKE
16 COMPRESSOR CASING
17, 21 STATOR VANE
18, 22 ROTOR BLADE
20 TURBINE CASING
23 EXHAUST DIFFUSER
24 ROTOR
25, 26 BEARING PORTION
27 CASING HOUSING
30 COMBUSTOR CASING
31 EXTERNAL CYLINDER
32 INNER CYLINDER
33, 33f TRANSITION PIECE
33C, 33Cc, 33Cf CLOSED ZONE
33L ACOUSTIC LINER ZONE
33WE, 33WEc OUTER WALL
33E OUTLET
33ST, 33SI, 33SS SIDE PORTION
33WI INNER WALL
33I INLET
33, 33c TRANSITION PIECE
33os OUTER PERIPHERY PORTION
34 INNER PORTION
36 ACOUSTIC LINER
40 PILOT BURNER
42 MAIN BURNER
50, 50c JACKET (COOLING MEDIUM INTRODUCTION UNIT)
50c1 FIRST JACKET (FIRST COOLING MEDIUM INTRODUCTION UNIT)
50c2 SECOND JACKET (SECOND COOLING MEDIUM INTRODUCTION UNIT)
50ds OUTSIDE SURFACE
50e2 OUTER WALL
50e1 INNER WALL
50ei PORTION
51, 51c, 51f1, 51f2 COOLING MEDIUM INLET
52, 52c CONNECTING PORTION
53, 53a, 53b BRANCHING PORTION
54 COOLING MEDIUM OUTLET
55AEa OUTLET
55A, 55Aa FIRST PASSAGE
55B, 55Ba SECOND PASSAGE
55C THIRD PASSAGE
55BIa INLET
56 INTERSPACE
57 BLOCKING MEMBER
58 PARTITIONING PORTION
58H COOLING MEDIUM PASSAGE
59 THERMAL BARRIER LAYER
a COOLING MEDIUM
AR AIR LAYER
CLP, CLPa, CLPc, LLP COOLING PORTION
G COMBUSTION GAS
HE, HT PORTION
L CENTRAL AXIS OF ROTATION
S, Z CENTRAL AXIS
θ, θc, θi ANGLE

The invention claimed is:

1. A combustor comprising:
a transition piece having a cylindrical shape, and including an inlet of combustion gas at one end and an outlet of the combustion gas at another end, and configured to lead the combustion gas entering from the inlet to flow out from the outlet so as to introduce the combustion gas into a turbine;
a cooling medium introduction unit provided at least on a portion of an outer periphery portion in a peripheral direction at an outlet side of the transition piece and in which a cooling medium is introduced;
a cooling medium inlet provided on the cooling medium introduction unit and configured to introduce the cooling medium into the cooling medium introduction unit;
a cooling portion provided on a first portion ranging from the outlet of the transition piece to a predetermined position toward the inlet, connected to the cooling medium introduction unit so as to pass the cooling medium from the cooling medium introduction unit toward the inlet from the outlet; and
a branching portion provided at least in a predetermined area in the peripheral direction of the transition piece including a second portion farthest from the cooling medium inlet and configured to allow some of the cooling medium inside the cooling medium introduction unit to flow into the cooling portion at a portion closer to the inlet than a connecting portion where the cooling portion is connected to the cooling medium introduction unit, wherein
the branching portion is provided at least at a central axis of rotation side of the turbine of the transition piece,
the cooling medium introduction unit is configured to flow the cooling medium introduced from the cooling medium inlet toward the outlet side from an inlet side of the transition piece, and then, flow the cooling medium into the cooling portion from the connection portion provided at the outlet side of the transition piece rather than the cooling medium inlet so that the cooling medium introduced into the cooling portion cools the transition piece while flowing toward the inlet side from the outlet side of the transition piece.

2. The combustor according to claim 1, wherein the cooling portion separates the cooling medium flowing from the connecting portion and the cooling medium flowing from the branching portion and allows them to pass through the cooling portion.

3. The combustor according to claim 1, wherein the cooling portion mixes the cooling medium flowing from the connecting portion and the cooling medium flowing from the branching portion at the branching portion and allows them to pass through the cooling portion.

4. The combustor according to claim 1, wherein the cooling medium introduction unit includes a first cooling medium introduction unit configured to allow the cooling medium to flow from the connecting portion to the cooling portion and a second cooling medium introduction unit configured to allow the cooling medium to flow from the branching portion to the cooling portion.

5. The combustor according to claim 4, wherein the second cooling medium introduction unit and the first cooling medium introduction unit are piled in the mentioned order toward an outside of the transition piece in a radial direction.

6. The combustor according to claim 1, wherein the cooling medium introduction unit includes a thermal barrier layer in an outside surface.

7. The combustor according to claim 1, wherein the cooling medium introduction unit includes an inner wall configured to surround a portion where the cooling medium is introduced and an outer wall provided outside the inner wall at a predetermined interval.

8. The combustor according to claim 1, wherein the cooling medium introduction unit includes a plurality of the cooling medium inlets.

9. A gas turbine comprising:
a compressor;
the combustor according to claim 1 configured to combust fuel and air compressed by the compressor so as to generate the combustion gas; and
a turbine driven by supplying the combustion gas from the combustor.

10. The combustor according to claim 1, wherein
the transition piece includes an inner wall and an outer wall,
the cooling portion includes a first passage, a second passage, and a third passage,
the first passage, the second passage, and the third passage extend in a direction from the outlet toward the inlet of the transition piece,
the first passage is provided to the outlet side of the transition piece, and the second passage and the third passage are provided to the inlet side of the transition piece,
the first passage is connected to the cooling medium introduction unit at the connecting portion and the cooling medium inside the cooling medium introduction unit flows into the first passage,
a first passage side of the second passage is blocked by a blocking member, and the third passage has an opening in the first passage side, and
the branching portion is a through hole which penetrates the outer wall provided over the second passage and connects an inner portion of the cooling medium introduction unit and the second passage.

\* \* \* \* \*